(12) United States Patent
Lamb

(10) Patent No.: US 9,771,447 B2
(45) Date of Patent: Sep. 26, 2017

(54) LOW AND MEDIUM VOLTAGE CABLE JOINT FILLED WITH COLD THERMOSETTING RESIN AND KIT FOR THE DEPLOYMENT THEREOF

(75) Inventor: Dave W. Lamb, Milan (IT)

(73) Assignee: PRYSMIAN S.P.A, Milan (IT)

( * ) Notice: Subject to any disclaimer, the term of this patent is extended or adjusted under 35 U.S.C. 154(b) by 715 days.

(21) Appl. No.: 13/387,339

(22) PCT Filed: Jul. 31, 2009

(86) PCT No.: PCT/IB2009/006415
§ 371 (c)(1),
(2), (4) Date: Jan. 26, 2012

(87) PCT Pub. No.: WO2011/012918
PCT Pub. Date: Feb. 3, 2011

(65) Prior Publication Data
US 2012/0125685 A1    May 24, 2012

(51) Int. Cl.
*H01B 3/44* (2006.01)
*C08F 220/18* (2006.01)

(52) U.S. Cl.
CPC ........... *C08F 220/18* (2013.01); *H01B 3/447* (2013.01)

(58) Field of Classification Search
CPC ...................................... H01B 3/447
See application file for complete search history.

(56) References Cited

U.S. PATENT DOCUMENTS

| 5,302,627 A | 4/1994 | Field et al. |
| 5,536,758 A | 7/1996 | Boldt |
| 5,688,601 A | 11/1997 | Usifer et al. |
| 6,444,305 B2 * | 9/2002 | Banovetz et al. ......... 428/321.5 |

(Continued)

FOREIGN PATENT DOCUMENTS

| EP | 0 492 830 A2 | 7/1992 |
| EP | 1 070 730 A2 | 1/2001 |
| GB | 2 433 511 A | 6/2007 |

(Continued)

OTHER PUBLICATIONS

International Search Report from the European Patent Office for International Application No. PCT/IB2009/006415, mailing date Mar. 29, 2010.

(Continued)

*Primary Examiner* — Liam J Heincer
(74) *Attorney, Agent, or Firm* — Finnegan, Henderson, Farabow, Garrett & Dunner, L.L.P.

(57) ABSTRACT

A joint for electric power cable, preferably operating at low and medium voltage, filled with a resin obtained in situ by contemporaneously cold setting a composition containing a (meth)acrylate ester of an alkanol having from 6 to 20 carbon atoms with a curing agent acting also as a tackifying agent and selected from the group consisting of a urethaneacrylate and an epoxylacrylate oligomer having a functionality from 1 to 6 in amounts ranging from 0.1 parts to 10 parts by weight per 100 parts by weight of the methacrylate ester. A kit for preparing a cable joint includes the joint and the composition for preparing the cured resin. The resin contained in the joint does not exhibit cold flow and therefore does not flow from the cable joint.

8 Claims, 1 Drawing Sheet

(56) References Cited

U.S. PATENT DOCUMENTS 7,368,663 B1    5/2008   Fisher et al.

FOREIGN PATENT DOCUMENTS

WO    WO 91/00896 A1    1/1991
WO    WO 2007/001937 A2    1/2007

OTHER PUBLICATIONS

French National Standard NF C33-010, Appendix G (1993).
Hoag, "Methods for the Assessment of Cold Flow in Matrix Transdermal Drug Delivery Systems" NIPE Research Conference (2015).
Abstract for Lobo et al., "Role of pressure-sensitive adhesives in transdermal drug delivery systems," *Ther Deliv.* 2016;7(1):33-48 (https://www.ncbi.nlm.nih.gov/pubmed/26652621).

* cited by examiner

LOW AND MEDIUM VOLTAGE CABLE JOINT FILLED WITH COLD THERMOSETTING RESIN AND KIT FOR THE DEPLOYMENT THEREOF

CROSS REFERENCE TO RELATED APPLICATION

This application is a national phase application based on PCT/IB2009/006415, filed Jul. 31, 2009, the content of which is incorporated herein by reference.

FIELD OF THE INVENTION

The present invention relates to electric power cable joints filled with a cold thermosetting resin having a low environment impact, and to a kit for the deployment thereof.

BACK GROUND OF THE INVENTION

A conventional cable joint for connecting power cables, i.e. cable having a conductor successively surrounded at least by an insulating layer, includes a junction body comprising connection means for connecting bared portions of the conductors of at least two cables together, and insulating means for surrounding the connection means. The junction body is contained in a box, typically made of polymer material, the cavity thereof being filled with a resin to provide electrical insulation, mechanical moisture ingress protection.

Resins used in the preparation of joints for power cables, especially for low and medium voltage power cables, are, for example, polyurethane based-casting resins.

As reported, for example, by EP 1070730, polyurethane based-casting resins are potentially hazardous because of the highly reactive isocyanate ingredient. Epoxy based systems are comparably hazardous. Acrylic resin compositions are used too, mostly based wholly or in part on methylmethacrylate and/or isobutyl methacrylate and ethylene-glycol dimethacrylate as curing agent, each of these compounds being classified as "irritant", liable to cause sensitization on skin contact and suspected to be teratogenic. The compositions as supplied are volatile with low flash point. Less volatile monomers can be used to reduce fire hazard but, in general, they are highly viscous, risking incomplete filling of the cavity, poor adhesion to cable materials, without avoiding possible health hazard.

WO 91/00896 discloses a sealing for environmental protection of cables, in particular by bonding, isolating and sealing. A related form of environmental protection may be provided at cable splices, where two or more cables are joined together. This is done by building a so called "splice case" around the splice. Such splice case may be filled with a sealing material to provide further protection around the connected conductors.

This sealing material comprising a solid polyester based polyurethane may be formed by at least one urethane acrylate of molecular weight ranging from 2000 to 7000.

The sealing material has to be heated before causing the flowing thereof in the interstices of, for example, the splice. The method of sealing a substrate comprises the step of providing a sealing material comprising a solid.

Further not being specifically directed to compositions useful for the preparation of joints for power cables, especially for low and medium voltage power cables, this document teaches the use of substantial amounts of urethane acrylate, thus providing compositions with the above mentioned toxicity problems. The presence of a solid material complicates the use of the sealing material.

U.S. Pat. No. 7,368,663 relates to moisture and fluid resistant electrical connections and sealant compositions for the same. The composition contains acrylate esters with $C_1$-$C_{16}$ alcohol and urethane-acrylate monomers. The urethane acrylate represents the main component, present in amounts of at least 60% by weight based on the total composition weight, whereas the diacrylate is present in amounts of at most 30%.

Viscous anaerobic sealant, for example thixotropic or gel, or non-flowable, i.e., room temperature solid, anaerobic sealant is used to provide a barrier against the ingress of moisture in an electrical connection, such as a wire connector.

Further not being specifically directed to compositions useful for the preparation of joints for power cables, especially for low and medium voltage power cables, this document encompass the use of substantial amounts of urethane acrylate, thus providing compositions with the above mentioned toxicity problems.

U.S. Pat. No. 5,688,601 relates to an article comprising an electrical component wherein at least a portion of a surface of the component has an exterior protective layer of a cured copolymer. This protective layer is a cured copolymer formed by reacting at least one oligomer having a terminal ethylenically unsaturated group and at least one monomer having a terminal ethylenically unsaturated group. Suitable oligomers include urethane acrylates, epoxyacrylates. The monomer having at least one ethylenically unsaturated may be selected from (meth)acrylate esters with $C_6$-$C_{20}$ alkanols. The oligomer is present in amount of from 10 to 90% by weight calculated on the total weight of the cured copolymer and the monomer is present in amounts of from 90 to 10%, based on the total weight of the cured polymer (corresponding to about from 11 to 900 parts by weight per 100 parts by weight of the starting monomer).

Also in this case this composition is not said to be useful for the preparation of joints for power cable, especially for low and medium voltage power cables. In addition, also in this case substantial amounts of urethane acrylate are required, thus providing compositions with the above mentioned toxicity problems.

WO 07/001,937 relates to photocurable elastomer compositions for "cure in place" applications, which may comprise from 35 to 65% based on the total composition weight of an acrylate polymer, which may be a homopolymer of a monomethacrylate ester $C_1$-$C_{10}$, and from 1 to 25% based on the total composition weight of a multifunctional reactant, which may comprise curing agents such as methacrylates.

The already mentioned EP 1070730 relates to resin compositions primarily suitable for filling electric cable joints. In particular, EP 1070730 teaches the use of a selected range of acrylic resin compositions that appear to be free of health hazards or, at worst, are only slightly irritants, have a flash point high enough, are sufficiently mobile to fill the joint cavity and adhere suitably to the material commonly used to produce cable joints (e.g. polyethylene crosslinked by a silane grafting technique). These resin compositions include a resin base consisting of at least one methacrylate of an alkanol of from 6 to 20 carbon atoms, together with a di or tri-(meth)acrylate crosslinker—for example, PEG 200 dimethacrylate, triethylene-glycoldimethacrylate and ethyleneglycol dimethacrylate—in an amount of from 0.2 to 5 parts by weight per 100 parts by resin base, an initiator, and at least one mineral filler, provided that, when the acrylate crosslinker is present in amount of at least 0.7 parts by weight per 100 parts of resin base, a non reactive solvent is present in the resin composition in an amount of from 0.1 to 10 parts by weight of the resin base to impart a sufficient adhesion of the resin to the cable joint cavity. Solvents used for this purpose are dimethyl ester of adipic acid, glutaric and succinic acid lactones and pyrrolidones.

As from the examples of said document, as resin base is intended the methacrylate of an alkano of from 6 to 20 carbon atoms.

GB 2433511 teaches a cold-setting composition for use in filling electric cable joints and which sets to form a resin having surface tack, the composition comprising, as resin base monomer, at least one acrylic ester of an alkanol, together with a di or tri-(meth)acrylate crosslinker present in an amount of from 0.2 to 5 parts by weight per 100 parts of resin base monomer, an initiator, and at least one mineral filler; characterised in that the composition further comprises a reactive diene present in the composition in an amount of 0.1 to 10 parts by weight per hundred parts of resin base monomer, the composition being substantially free from non-reactive solvent. The use of the reactive diene is used instead of the non-reactive solvent taught by EP 1070730.

The resin compositions of EP 1070730 and GB 2433511 suffer from the following problems:

They are too soft to resist to mechanical damage.

They are subject to the so-called "cold flow", i.e. the resin material, even after cold curing, tends to move to self level under its own weight, thus potentially leaving "uncovered" portions of the cable joints.

The addition of a crosslinker for overcoming the above listed drawbacks, even in low amounts such as 0.7 parts per 100 parts by weight of the resin base, worsens the adhesion properties of the resin to the joint cavities (the so-called surface tack), and makes necessary the use of a further additive improving the adhesion properties (such as the solvent encompassed in EP1070730 or the reactive diene in the resin composition of GB2433511).

The additive for improving the adhesion properties has the effect of compromising cold flow.

SUMMARY OF THE INVENTION

The Applicant has now unexpectedly found that by replacing the di or tri-(meth)acrylate crosslinker used in EP 1070730 and GB 2433511 with a predetermined amount of an oligomer selected from the group consisting of urethane-acrylate oligomers and epoxy-acrylate oligomers, the resin obtained does not show cold flow. In addition, by using the crosslinker of the invention, the surface tack of the composition is not impaired. Without being bound to any theory, the Applicant observed therefore that the aforementioned curing agent seems to act also as tackifier, thus allowing skipping the addition of an additive of this kind (a solvent of a reactive diene as in the case of the prior art) to the composition.

In one aspect the present invention relates to a joint cable for electric power especially operating at low or medium voltage, a monomeric composition containing as the monomer a (meth)acrylate ester of an alkanol of from 6 to 24 carbon atoms with a curing agent acting, selected from the group consisting of the aforementioned urethaneacrylate or epoxyacrylate oligomers, in amounts ranging from 0.1 to 10 parts by weight per 100 parts by weight of the starting monomer.

The cold setting of the composition of the invention is attained by polymerization of the components thereof.

In another aspect the invention further relates to a kit for preparing said electric power cable joint, especially for operating at low and medium voltage, filled with a resin obtained in situ by cold setting, the kit comprising:
A) an unfilled cable joint,
B) a cold setting composition being pourable into said cable joint (A) and containing:
(i) the above mono(meth)acrylate ester
(ii) a radical catalyst,
(iii) a filler,
(iv) a curing agent selected from the aforementioned urethane acrylate in the above said amounts.

When the monomer comes in contact with the radical catalyst polymerises in situ and the homopolymer obtained cures in the presence of the curing/tackifying agent, thereby filling and sealing the internal cavity of the cable joint.

DETAILED DESCRIPTION OF THE INVENTION

In the present description and claims as "joint of cable for electric power" it is meant a straight or branched tubular enclosure, which may be made, for example, of acrylonitrile butadiene styrene (ABS) or high impact polystyrene (HIPS). Advantageously, the enclosure may also be made from non halogenated polymers for low smoke zero halogen (LS0H) applications. The material of the enclosure may be opaque or transparent. For all applications, the enclosures may be available on the market already. provided with the connectors to join the cable, or alternatively the connectors may be sold apart.

Figure 1:
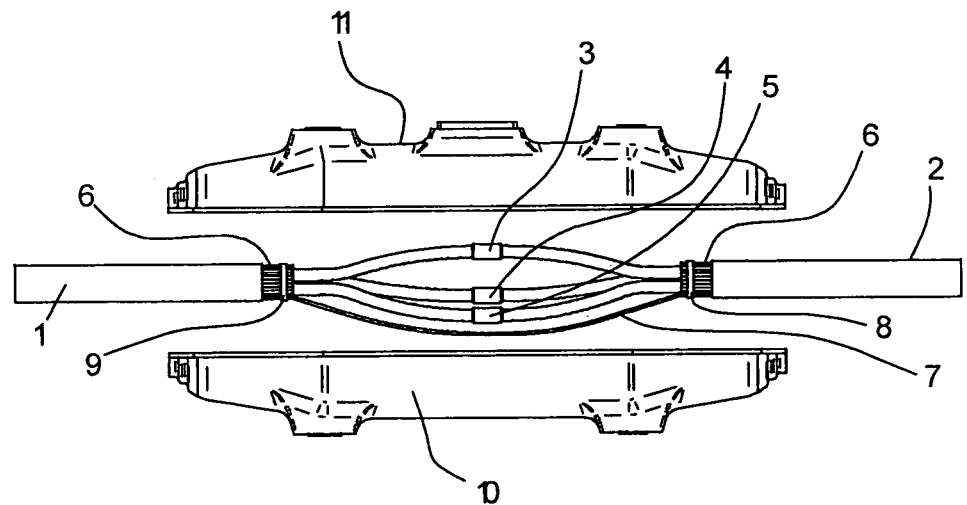
FIG. 1 is a diagrammatic side view of a cable joint in accordance with the invention in course of assembly.
Figure 2:
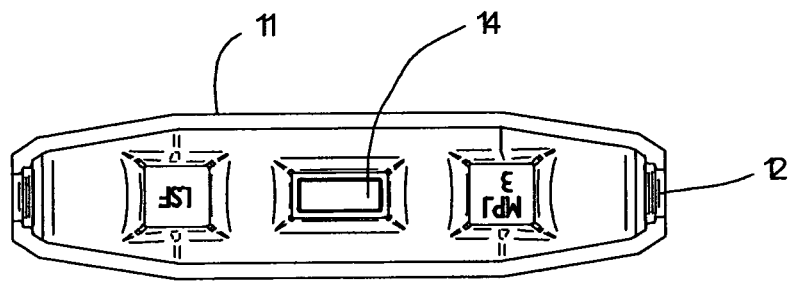
FIGS. 2 and 3 are top views respectively of upper and lower enclosure halves forming parts of the cable joint of FIG. 1.
Figure 3:
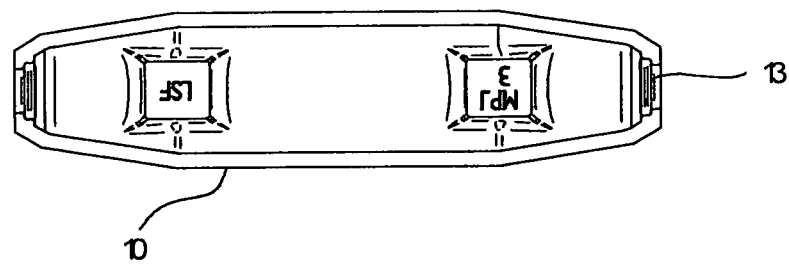

In FIG. 1 the two enclosure halves 10,11 of a joint 100 are positioned about two lengths of 3-core single-wire-armoured power distribution cable 1 and 2, respectively. The cable ends are cut back and the corresponding cores connected electrically by connectors 3, 4, 5. The armour wires 6 are electrically bonded together, for instance using a copper braid 7 and constant-force spring (clock spring) connecting devices 8, 9. The whole is enclosed using lower and upper plastics enclosure halves 10 and 11, shown respectively in FIGS. 2 and 3, too to provide the enclosure of the cable joint 100. The tapered end-parts 12 and 13 of each enclosure 10,11 may be trimmed, if required, to fit the diameters of the cables. The resin composition of the invention can be poured into the joint through the central opening 14 in the upper enclosure-half 11, and allowed to harden by cold curing.

The joint of the invention are particularly suitable for low and medium voltage cable.

The term low voltage is used to indicate voltages lower than 1 kV.

The term medium voltage is used to indicate voltages of from 1 to 35 kV.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Advantageously, an oligomer according to the invention has an average molecular weight of from 300 to 8000 Da, preferably of from 800 to 6000.

Preferably the composition of the invention contains the monomer (i) in an amount lower than 40% by weight with respect to the total weight of the composition (B), more preferably in an amount lower than 25%, more preferably higher than 10%.

Preferably the composition (B) of the kit according to the invention contains the curing agent (iv) acting also as tackifying agent in amounts of from 0.3 to 5 parts by weight per 100 parts by weight of the component (i).

The urethane acrylate oligomers and epoxyacrylates oligomers as curing agent (iv) according to the invention may be of aromatic and aliphatic type. Preferred urethane acrylate oligomers can be selected from di-, tetra- or hexa-functional aromatic or aliphatic oligomers. Preferred epoxyacrylates oligomers can be selected from di-, tetra- or hexa-functional aromatic or aliphatic oligomers. Examples of commercially available products useful for this aim are marketed by Sartomer under the trademark Craynor.

Examples of (meth)acrylate ester (i) useful for the composition of the invention are 2-ethylhexyl (meth)acrylate, isodecyl(meth)acrylate, isooctyl(meth)acrylate, octyl-decyl(meth)acrylate, tridecyl(meth)acrylate, stearyl(meth)acrylate. A preferred monomorer (i) is isodecylmethacrylate ester.

For the purpose of the present invention for radicalic catalyst, it is meant a catalyst triggering a polymerization/curing reaction of monomers composition occurring with essentially radical mechanism which therefore may be carried out also in the absence of light.

The radicalic catalyst (ii) present in the composition (B) of the invention may be any radical catalyst of conventional type. Preferably, organic peroxides can be used as radical catalyst (ii), for example benzoylperoxide.

The filler (iii) may be of various types as a function of the specific application of the cable joint. Mineral fillers such as chalk and sand can be used, and solid or hollow glass beads and some grades of fly ash. Solid or, preferably, hollow mineral microspheres can be used alone or in combination with chalk and/or sand or other mineral fillers adapted to reduce the density of the fillers and therefore increasing the maximum volume of the resin to be supplied.

Barium titanate can be used as high permittivity filler. Other fillers may include antimony trioxide, zinc borate, gypsum, wollastonite, clays, mica, quartz, silicon carbide, zirconium silicate, carbon black, synthetic zeolites and oxides e.g. of aluminium, magnesium, zinc and titanium oxides.

The composition (B) can be loaded with a high amounts of filler, for example up to 85% by weight based on the total composition (B) weight (650 parts by weight per 100 parts by weight of the monomer (i)).

The cable joints and the kit for preparing the same can be advantageously used for LS0H applications. In fact further to the advantages exposed above, the cable joint of the invention also solves another technical problem of the joint cable of the prior art. The known resin compositions containing flame retardant agent adapted for LS0H application have little or no adhesive performance. The use of urethane acrylate oligomers and epoxyacrylates oligomers as curing agent (iv) allows to incorporate flame retardant agent and have enhanced sealing capability (connected with a suitable adhesion of the composition to the cable joint parts.

Flame retardant agent adapted for the composition of the invention can be selected from inorganic oxides and hydroxide, for example magnesium or aluminium oxides or hydroxides. A preferred zero halogen flame retardant agent according to the invention is alumina trihydrate. The composition of the inventions can be loaded zero halogen with a high amounts of flame retardant agent, for example up to 75% by weight based on the total composition (B) weight as in the case of alumina trihydrated as LS0H filler (corresponding to about 350 parts by weight per 100 parts of the monomer (i)).

In the case a more rapid cure is desired, a catalyst accelerator may be further used. These kinds of additives are generally products of condensation, for example, between p-toluidine and ethylene oxide, also defined as PTE.

Preferably the composition (B) of the invention is in a two-pack composition, a first pack containing the (meth)acrylate ester monomer (i), the curing agent (iv) and the optional curing accelerator, the second pack containing the filler and the radical catalyst, in order to avoid a premature polymerisation, before the composition is completely poured.

The curing by polymerization of the composition of the invention can take place irrespective from the presence of light (including UV and IR irradiation). In view of the technical field of the invention where the composition should polymerize in a substantially closed environment—the joint box—a photocuring could not or could hardly be carried out even in the case of a transparent box, because the box material could anyway hinder the effect of the actinic radiation.

The conventional compositions exhibit poor or absent adhesive property. The use of the curing additive according to the present invention in place of the acrylates taught by the prior art, for example PEG200 dimethacrylate, increases the adhesive properties, thus rendering not necessary the use of additional sealing mastics which are indeed indispensable, when using the conventional cross-linker to ensure adequate property and therefore insulation resistance.

The following examples of the composition (B) of the kit of the invention are provided for illustrative but not limiting purposes.

COMPARATIVE EXAMPLE

Composition A

The standard composition (in parts by weight) disclosed in EP 1070730 is as follows:

| | |
|---|---|
| IDMA (isodecylmethacrylate) | 100 |
| PTE (p-toluidine-thylene oxide) | 1.2 |
| PEG200DMA (polyethyleglycol200 dimethacrylate) | 0.3 |
| Silica Sand | 400 |
| Calcium Carbonate | 150 |
| Benzoyl Peroxide (20%) | 20 |

The liquid components (IDMA, PTE and PEG200DMA) are supplied by either Cognis or Evonik Silica sand is a C30 grade supplied by WBB Minerals and the calcium carbonate is Calmote AD from OMYA.

EXAMPLE 1-4

In the following composition according to the invention, PEG200DMA was eliminated and replaced by Craynor CN976, supplied by Cray Valley (Sartomer Corporation;

aromatic urethane diacrylate, mean molecular weight 5800) and the following compositions were prepared CN976 concentrations of 0.3, 3 and 5 parts per hundred parts IDMA.

Compositions (parts by weight) according to the invention were prepared as from Table 1.

TABLE 1

| Composition 1 | Composition 2 | Composition 3 | Composition 4 |
|---|---|---|---|
| IDMA | 100 | 100 | 100 |
| PTE | 1.2 | 1.2 | 1.2 |
| Craynor CN976 | 0.3 | 3.0 | 5.0 |
| Silica Sand | 400 | 400 | 400 |
| Calcium Carbonate | 150 | 150 | 150 |
| Benzoyl Peroxide (20%) | 20 | 20 | 20 |

Cold Flow Test:

This test was carried out on Composition (A) and on Composition 1 of the invention according to the operating conditions described in French National Standard NF C33-010, Appendix G (1993).

In order to meet the requirements of the above specification, there should be no evidence of material flow after heating at 100° C. Flow was detected with Composition A, but not in Composition 1 (the former containing 0.3 parts by weight of PEG200-dimethacrylate and the latter containing 0.3 parts by weight of urethane acrylate).

The results obtained demonstrate the improvement in inhibiting cold flow of the new formulation even when containing low amounts of curing agent, if compared to that of the prior art.

Compositions A, B and C in Table 1 of GB 2433511 (which advocates the use of reactive polybutadienes as tackifying additives) were evaluated by the cold flow test, too. All of these compositions showed evidence of flow.

The invention claimed is:

1. A joint for electric power cable filled with a resin obtained in situ by cold setting a composition comprising (meth)acrylate ester monomer of an alkanol having from 6 to 20 carbon atoms in the presence of a curing agent selected from an aromatic urethane-di-acrylate oligomer, in an amount from 0.3 to 5 parts by weight calculated per 100 parts of said (meth)acrylate ester,
   wherein said composition is free of further additives that improve adhesion properties of the resin obtained in situ, and
   wherein the resin obtained in situ does not show cold flow in a cold flow test according to French National Standard NF C33-010, Appendix G (1993).

2. The joint for electric power cable according to claim 1, wherein said (meth)acrylate ester monomer is isodecylmethacrylate ester.

3. The joint for electric power cable according to claim 1, wherein said curing agent oligomer has an average molecular weight from 300 to 8000 Da.

4. The joint for electric power cable according to claim 3, wherein said curing agent oligomer has an average molecular weight from 800 to 6000 Da.

5. The joint for electric power cable according to claim 1, wherein said composition comprises a filler.

6. The joint for electric power cable according to claim 1, wherein said composition comprises a flame retardant agent.

7. The joint for electric power cable according to claim 1, wherein said composition comprises (meth)acrylate ester monomer in an amount lower than 40% by weight with respect to the total weight of the composition.

8. The joint for electric power cable according to claim 1, wherein said composition comprises (meth) acrylate ester monomer in an amount lower than 25% by weight with respect to the total weight of the composition.

* * * * *